(12) United States Patent
Natrop et al.

(10) Patent No.: US 6,488,793 B2
(45) Date of Patent: Dec. 3, 2002

(54) DEVICE AND METHOD FOR HEATED TOOL WELDING

(75) Inventors: Joachim Natrop, Dettingen/Erms (DE); Dietmar Moench, Kohlberg (DE)

(73) Assignee: Bielomatik Leuze GmbH + Co. (DE)

( * ) Notice: Subject to any disclaimer, the term of this patent is extended or adjusted under 35 U.S.C. 154(b) by 61 days.

(21) Appl. No.: 09/747,747

(22) Filed: Dec. 22, 2000

(65) Prior Publication Data

US 2001/0006087 A1 Jul. 5, 2001

(30) Foreign Application Priority Data

Dec. 24, 1999 (DE) .......................... 199 62 974

(51) Int. Cl.⁷ .............................................. B30B 15/34
(52) U.S. Cl. .................. 156/64; 156/228; 156/351; 156/583.1
(58) Field of Search ................... 156/350, 351, 156/580, 583.1, 64, 228

(56) References Cited

U.S. PATENT DOCUMENTS 5,975,183 A * 11/1999 Reis et al. ............... 156/580
5,997,681 A * 12/1999 Kinzie ...................... 156/263
6,136,132 A * 10/2000 Kinzie ...................... 156/258

FOREIGN PATENT DOCUMENTS

| DE | 31 44 843 A1 | 6/1982 |
| DE | 31 44 155 A1 | 5/1983 |
| DE | 35 37 670 A1 | 4/1987 |
| DE | 38 36 003 A1 | 4/1990 |
| DE | 39 22 066 A1 | 1/1991 |
| DE | 41 01 545 A1 | 7/1992 |
| DE | 195 40 119 A1 | 5/1996 |

* cited by examiner

Primary Examiner—James Sells
(74) Attorney, Agent, or Firm—Akerman Senterfitt

(57) ABSTRACT

A device and a method for heated tool welding. The heated tool welding device has a welding held, which is fixed to an infeed drive for displacing the welding head. The infeed drive is an industrial robot. The welding head is positioned by the industrial robot in a coordinate-controlled manner up to a clearly defined changeover position with respect to the welding point on the body and in a force-controlled manner from the changeover point to the welding point.

14 Claims, 7 Drawing Sheets

DEVICE AND METHOD FOR HEATED TOOL WELDING

Figure 1:
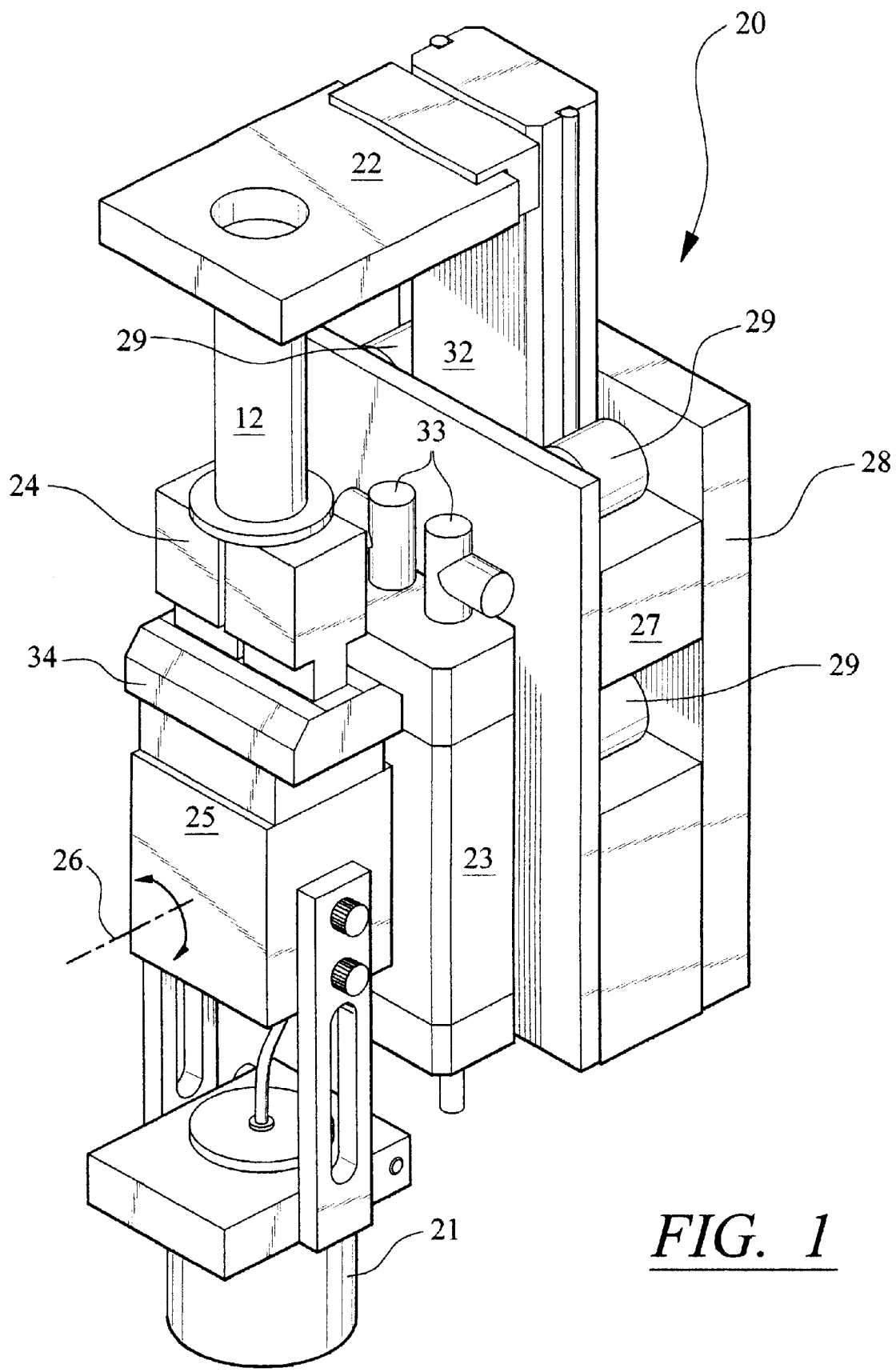

The invention relates to a device and a method for heated tool welding.

Heated tool welding is often used for fixing welding parts to a body. Heated tool welding methods are particularly used when the body and welding part are made from thermoplastic materials. One field of application for such heated tool welding more particularly arises if the welding parts are welded to a blown article as the body. Such blown articles are e.g. fuel tanks of motor vehicles, to which are fixed numerous welding parts, e.g. tank filling pipes, connecting lines, etc. using heated tool welding.

For this purpose normally use is made of welding machines, which have a force-controlled infeed drive and which are able to move a welding head with a gripper for the welding part on the one hand to the transfer point for the welding part and on the other to a fixed welding point. For each welding part it is necessary to provide a separate infeeder, which is only able to weld the welding part at a predetermined point. In order to attain a reliable, fluid-tight welding process, the heated tool welding must take place in force-controlled manner with respect to the application force both of the heating mirrors and the welding part to the welding point.

The problem of the invention is to develop a device and a method for heated tool welding able to fit by heated tool welding fittings to different points of a body.

According to the invention this problem is solved by the device and method according to the independent claims 1 and 7.

A device according to the invention for heated tool welding has a welding head, which is fixed to an infeed drive for moving the welding head. According to the invention the infeed drive is an industrial robot. The welding head is positioned by the industrial robot in coordinate-controlled manner into a clearly defined changeover position with respect to the welding point on the body and in force-controlled manner from the changeover point to the welding point.

A heated tool welding device constructed in this way has the advantage that through the industrial robot in its movement area it permits virtually random orientations between the body and the welding part. Thus, it is possible to move the welding head to different points with respect to the body. By means of a single gripper on a single welding head it is consequently possible to fix several identical welding parts to a single body. Simple resetting to different bodies is also possible, because for this purpose it is merely necessary to preset different coordinate values for the changeover point and for the infeed direction of the welding head from the changeover point to the welding point.

The industrial robot is preferably a 6-axis industrial robot. Such industrial robots have the greatest freedom of movement for the final effector fixed thereto, in this case the welding head.

A preferred development of the invention provides a force sensor for determining the forces in all directions between the robot arm and welding head.

According to another preferred development of the invention the welding head can be automatically coupled to the robot arm. This makes it possible with a single industrial robot to automatically change the welding head and consequently provide a single body with different welding parts, which need not necessarily be weldable with the same gripper and the same heating mirrors for the body and the welding part. Besides one changer for the entire welding head, it is also possible to provide a changer for the gripper of the welding part. This is advantageous if the welding parts admittedly have such similar welding points that a heating of both the welding point and the welding part can take place by means of the same welding mirror, but the shape of the welding part makes it necessary to use different grippers for the welding parts. As a result of this construction it is possible to equip a single body with all the welding parts to be fitted thereto. As a result of the short setting up times it is possible to very flexibly adapt to the body. As a result of the very free determination of the position of the welding points, it is also possible to equip bodies having the most varied shapes with the same device with the welding points thereof. This makes it possible with short setting up times and low setting up costs to equip small batches on the same welding device for heated tool welding.

According to another preferred development of the invention the difference between the force between welding head and robot arm at the changeover point compared with the actual values is used as a reference quantity for the force control.

According to an inventive method the welding head is firstly moved to an acceptance point, where a welding head-side gripper accepts a welding part. The welding head is then displaced and oriented in coordinate-controlled manner in a changeover position preset on the body with respect to the welding point of the welding part to be welded. Subsequently there is a change from coordinate control to force control. The welding head is moved on a predetermined path in force-regulated manner to the welding point.

According to a preferred development, the forces acting between the welding head and robot arm are measured for force regulation purposes.

According to another preferred development the forces measured in the changeover position between robot arm and welding head are used as the reference quantity for force regulation.

According to an advantageous development the desired forces for the force regulation are preset as a function of the welding process.

According to another preferred development the force components of the desired force are preset in such a way that the desired force is oriented perpendicular to the body surface at the welding point.

It is also advantageous for the method to be such that initially a heating mirror passes with a predetermined pressing force into engagement with the welding point of the body. The welding head is then moved into an intermediate position, where the welding head is no longer in contact with the body. In the intermediate position the welding part is oriented towards the welding point and is subsequently brought in controlled manner into engagement with the body.

According to a preferred development of the invention the intermediate position corresponds to the changeover position. It is also advantageous to perform the orientation of the welding part towards the welding point without any movement of the robot arms in the robot head.

The subclaims contain mutually combinable developments of the device or method according to the invention. In addition, an embodiment of the invention is represented in the drawings, wherein show:

FIG. 1 A welding head in a position after receiving the welding part prior to the start of the welding process.

Figure 2:
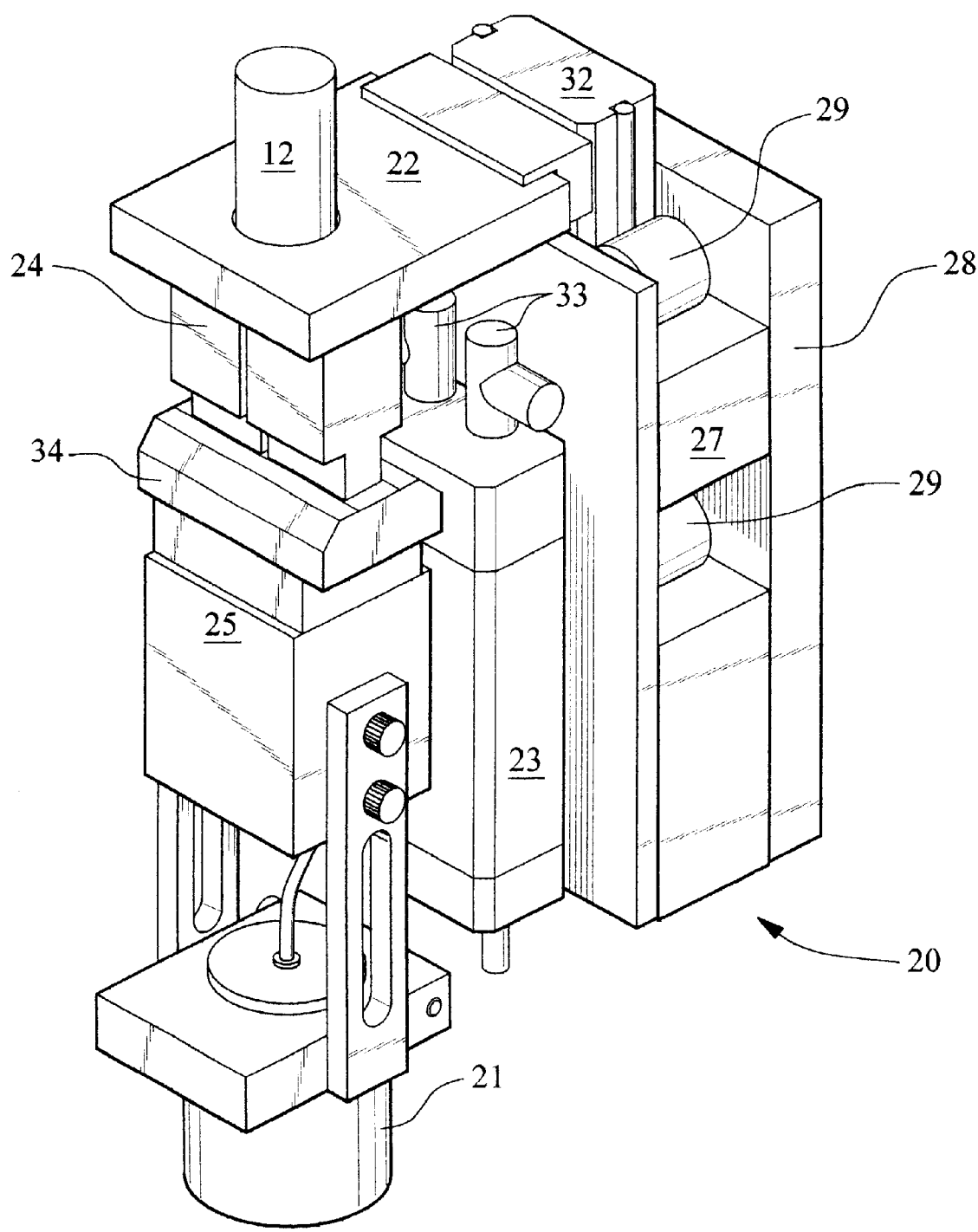

FIG. 2 The welding head of FIG. 1 in the position where both the welding part and the body are premelted and melted on.

Figure 3:
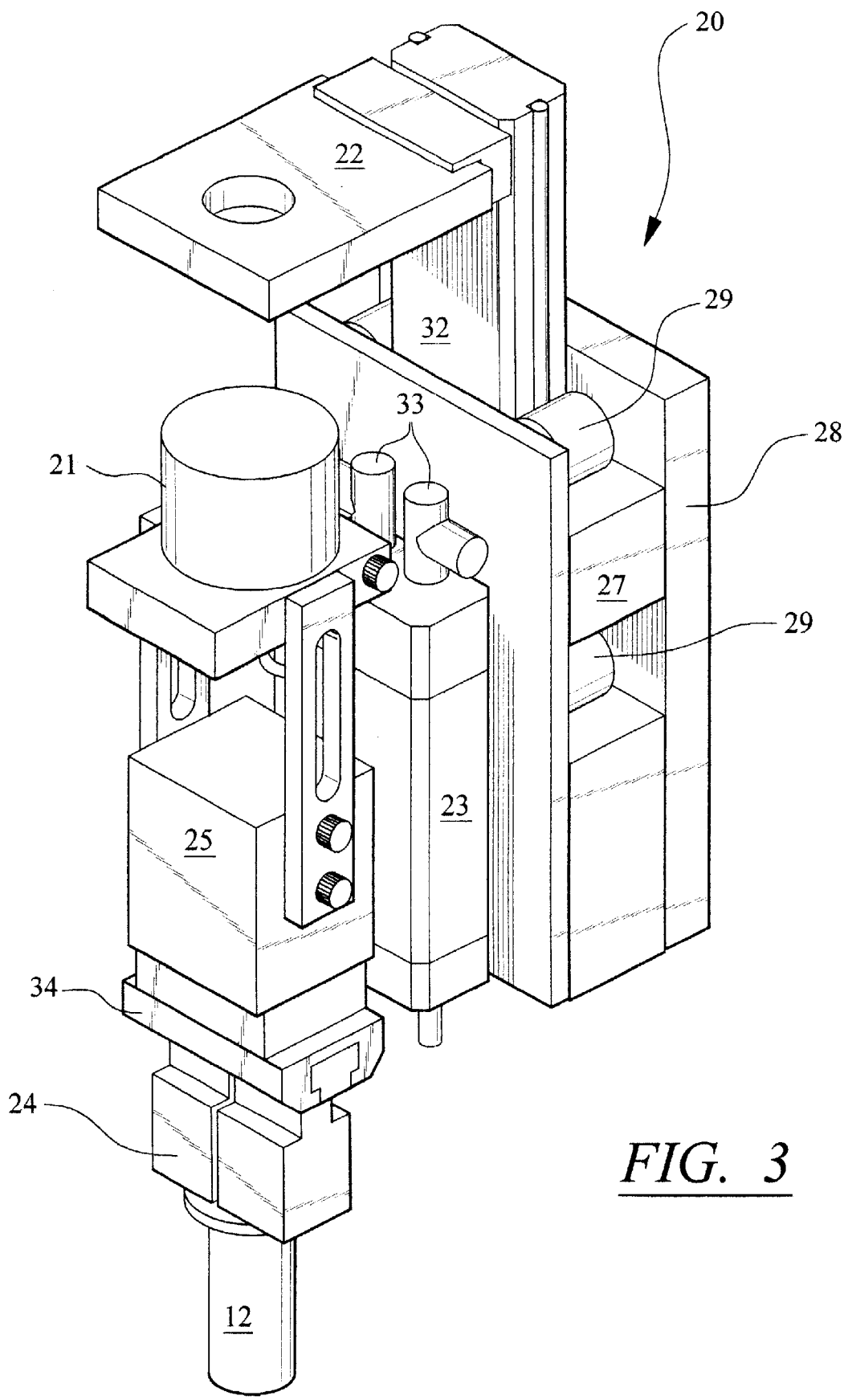

FIG. 3 The welding head of FIGS. 1 and 2 in the position where the welding part can be brought into engagement with the welding point on the body.

Figure 4:
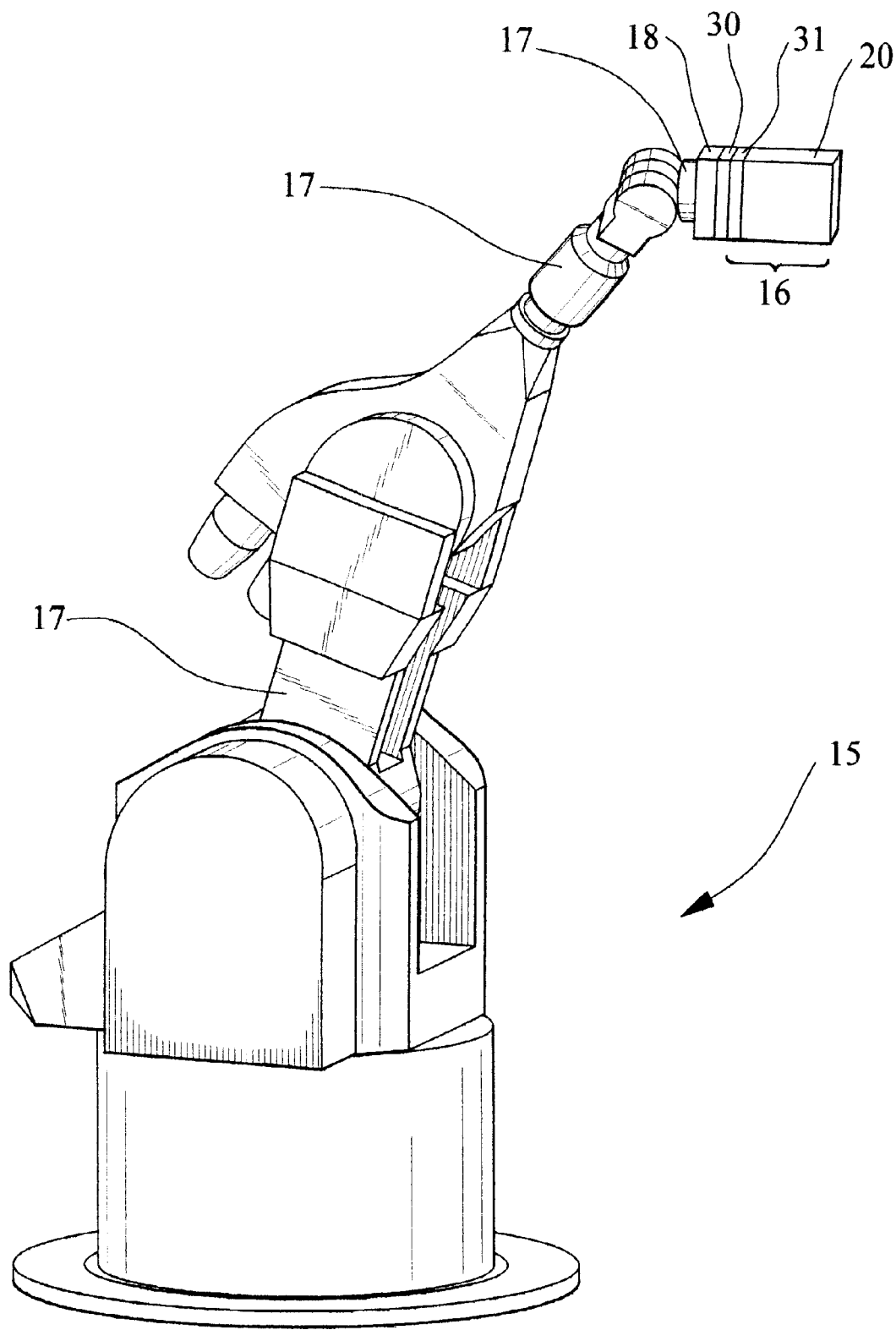

FIG. 4 An industrial robot with a diagrammatically represented welding head as the final effector.

Figure 4A:
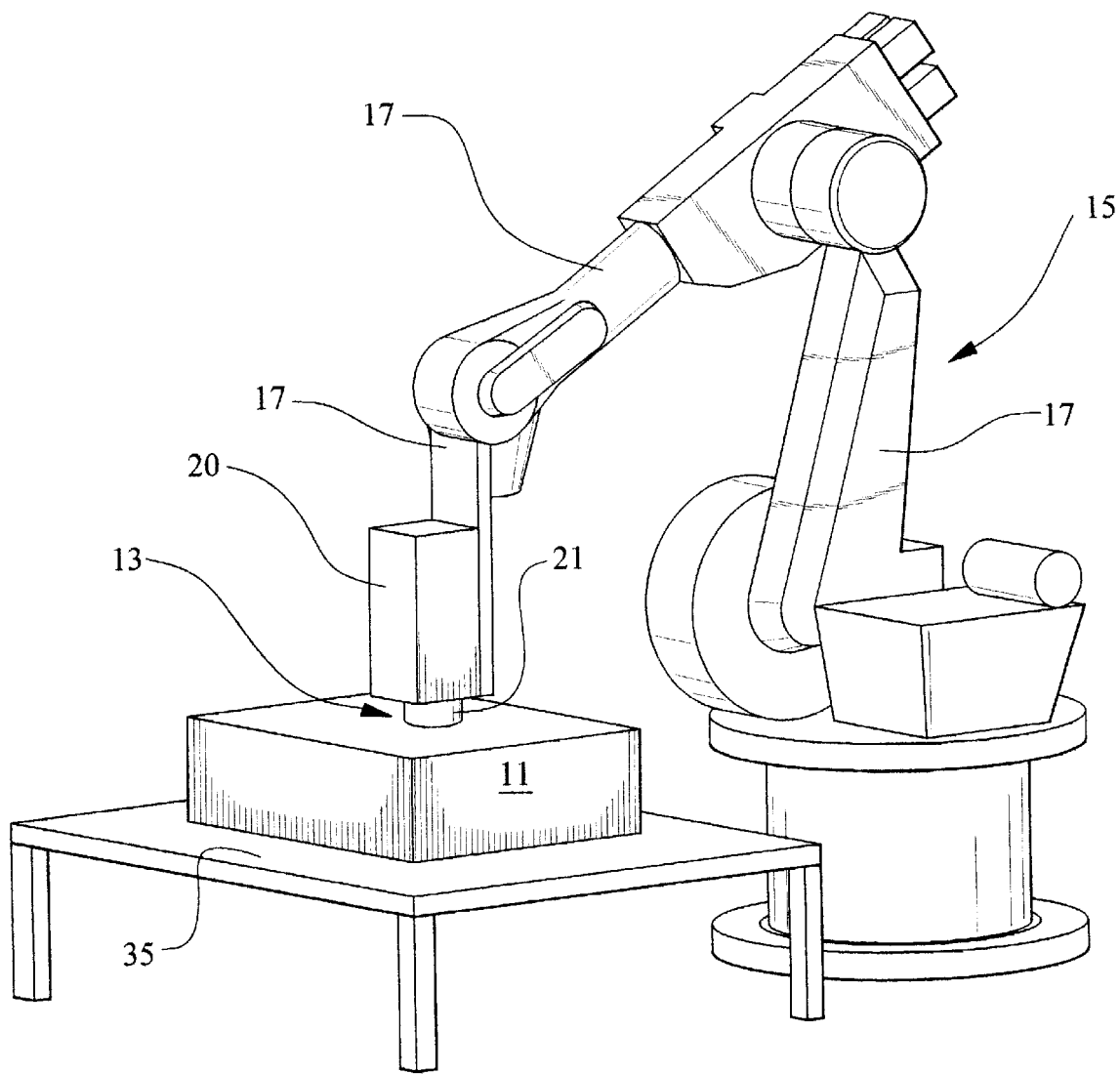

FIG. 4a An industrial robot with a welding head in engagement with the body.

Figure 5:
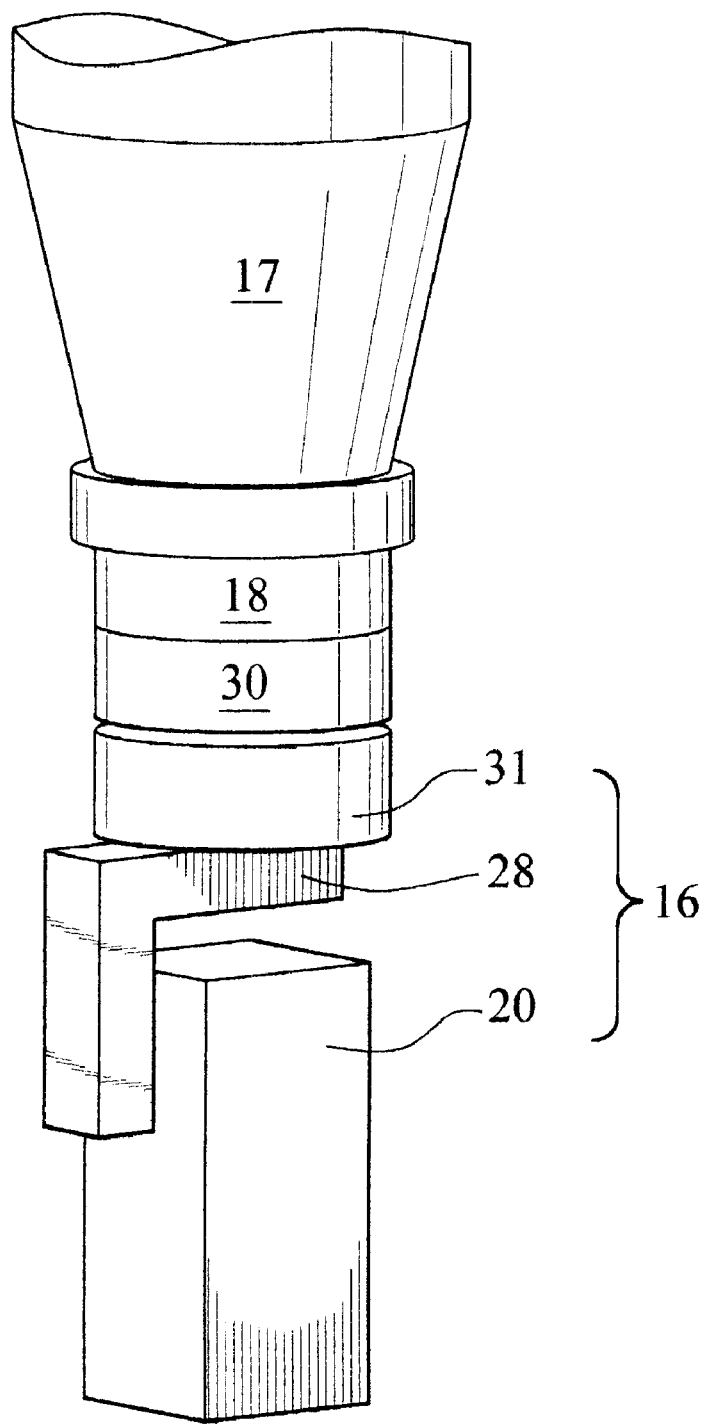

FIG. 5 A diagrammatically represented welding head with its coupling to the arm of the industrial robot.

Figure 6:
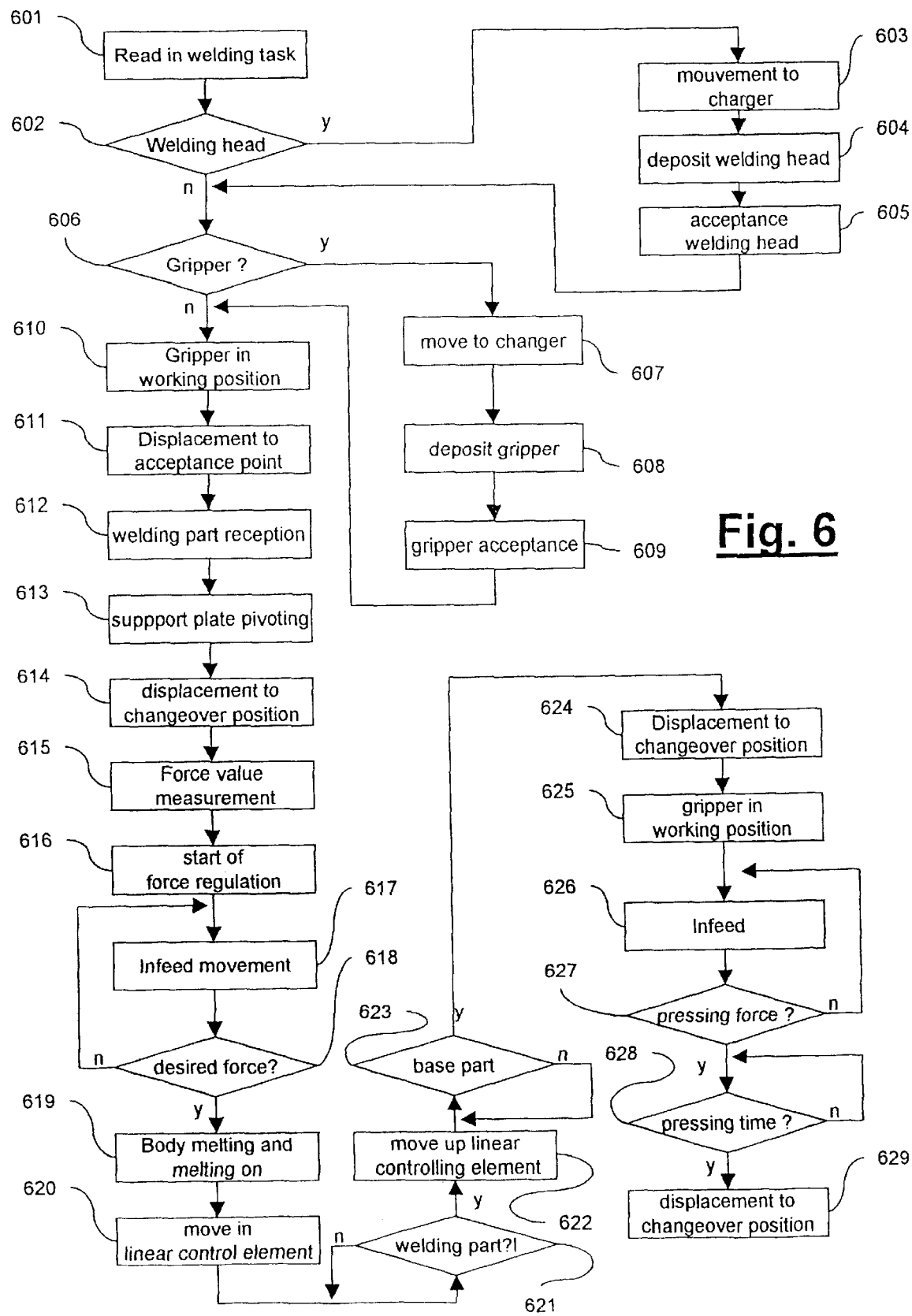

FIG. 6 The diagrammatic flow chart of a method for welding a welding part with a welding head and an industrial robot.

FIG. 1 shows the welding head 20 suitable for serving as a final effector of a welding robot and by means of which the welding part and body can be premelted and melted on independently of one another. To the base plate 28 is on the one hand fixed the supporting member 25 and on the other the linear controlling element 27 with the pedestal 32 linearly displaceable by means of the drive rollers 29 and on whose end is located the second welding mirror 22.

The linear controlling element 27 is a pneumatic actuator unit or preferably an electrically driven stepping motor, which by means of a transmission acts on at least one part of the driving rollers 29. The driving rollers 29 are either friction rollers, which act on the flank of the pedestal 32 and consequently in frictionally engaging manner permit a displacement of the pedestal 32 and consequently the second welding mirror 22 from a non-engagement position into the engagement position shown in FIG. 2. Alternatively to the friction rollers, the drive rollers 29 can also be in the form of a toothed drive with pinions and rack constructed on the pedestal 32. The displacement of the pedestal 32 or the second welding mirror 22 takes place in such a way that the application force of the welding mirror 22 to the welding part 12 is regulated or controlled. This makes it possible with different application forces of the welding mirror 22 on the welding part 12 to initially effect a premelting process and then, with reduced force, a melting on process of the welding point on the welding part 12.

The drive means 23 for the displacement of the supporting member 25 is also located on the base plate 28. It is preferably in the form of a fluidically, particularly pneumatically driven rotary controlling element, which is supplied by not shown fluidic lines leading to the line connecting piece 33. The supporting member 25 can be pivoted by 180° about the pivoting axis 26, so that, as desired, either the first welding mirror 21, as shown in FIG. 1, is oriented towards the welding point of the body or, as shown in FIG. 3, the gripper with the welding part held therein is oriented towards the welding point on the body.

The welding head is always in the position shown in FIG. 1 when, following the reception of the welding point by the gripper 24, the supporting member 25 is pivoted by 180° in such a way that the first welding mirror 21 engages with the welding point of the body. In this position the welding head is moved towards the body and remains in this position. for as long as only the body is heated by means of the first welding mirror 21, but as yet no heating of the welding part 12 takes place.

FIG. 2 shows the welding head 20 of FIG. 1 in a position as assumed both by the body and the welding part 12 during the heating of the welding points.

To pass from the position shown in FIG. 1 into that shown in FIG. 2, the pedestal 32 is displaced by means of the linear controlling element 27 with its drive rollers 29. Thus, the welding mirror 22, which is fixed to the pedestal 32, engages with the welding point of the welding part 12. The welding mirror 22 is constructed in such a way that only the portions of the welding part 12 located in the vicinity of the welding point engage with the welding mirror 22. Apart from a full-surface welding mirror, in the manner shown said mirror can in particular have a recess, so that the portions projecting into the body do not engage with the welding mirror 22. For this purpose the welding mirror 22 is displaced together with the pedestal 32 in the direction of the gripper 24. Displacement takes place in force-controlled or regulated manner until the engagement position of the welding mirror 22 is reached. Preferably the engagement position is reached when the application force of the welding mirror 22 on the welding part 12 reaches a predetermined force value, which can differ as a function of the application time. Thus, for a first preheating phase of the thermoplastic material of the welding part 12, a higher application force of the welding mirror 22 can be chosen as compared with a following softening phase for the thermoplastic material of the welding part 12 in the vicinity of the welding point.

A change in the position of the supporting member 25 with the gripper 24 and the first welding mirror 21 through the driving means 23 has not yet taken place.

The welding head 20 is in the position shown in FIG. 2 if the first welding mirror 21 is in engagement with the welding point of the body and simultaneously the welding part 12 is to be heated. Following the end of the premelting and melting on of the thermoplastic material of the welding part 12, the welding mirror is moved by means of the pedestal 32 and linear drive 27 back into the position shown in FIG. 1. The first welding mirror 21 can still be in engagement with the body. Only when the premelting and melting on phase has ended on the body, is the welding head 20 moved away from the welding point on the body to such an extent that a movement of the first welding mirror and the welding point can take place by pivoting the supporting member 25 about the pivoting axis 26 using the drive means 23 in such a way that the body is outside the movement area of welding part 12 and welding head 20.

Through the pivoting movement of the supporting member 25 about the pivoting axis 26 by 180° out of the position shown in FIG. 1, the posititon shown in FIG. 3 is reached.

As shown in FIG. 3, the welding part 12 and the gripper 24 of the welding head 20 are now in a position oriented towards the welding point on the body. The position of FIG. 3 is reached from the position shown in FIG. 1 by pivoting the supporting member 25 about the pivoting axis 26. Instead of pivoting by 180°, in the case of a correspondingly different arrangement of gripper 24 and first welding mirror 21 on the supporting member 25 it is also possible with smaller pivoting angles (e.g. 90°) to provide other displacement drives, which on the one hand displace the first welding mirror 21 into a position where it is no longer in engagement with the body to which the welding part 12 is welded and simultaneously the welding part 12 or gripper 24 of welding head 20 can be oriented towards the body. However, it is advantageous if the second welding mirror 22 can be engaged with the welding part 12 when the first welding mirror 21 is in its working position, i.e. is oriented towards the welding point 13 on the body 11.

FIG. 4 diagrammatically shows the welding head 20 in the manner where it can be provided as a final effector of an industrial robot 15.

The industrial robot 15 can be pivoted about its arm 17 and perpendicular thereto, it being in the form of a 6-axis robot. By coordinate control such a robot can approach virtually any point within its movement space and orient the welding head in accordance with a desired direction. To enable the welding robot to also effect the force-regulated application of the welding head 20 to the body, said industrial robot has a force sensor 18 positioned between the robot arm 17 and the robot arm-side coupling 30. The force sensor is not only in a position to determine the force acting axially to the robot arm 17 and instead preferably also determines forces in other directions. In optimum manner the resolution of the force sensor 18 makes it possible to determine in all directions forces and moments acting thereon. If all the forces and moments are determined, it is possible to so engage the final effector 16 with the welding head 20 with the body that tilting moments or torques, which could act between the body and the welding head 20, can be compensated by corresponding displacement of the welding head 20 by the industrial robot.

It is also possible to have a following up or tracking of the welding head corresponding to the reversible deformation of the body occurring during the welding process as a result of the forces introduced.

FIG. 4a diagrammatically shows the welding head 20 as the final effector of an industrial robot 15 in its position with respect to a body 11. The first welding mirror 21 of the welding head 20 in the welding point 13 is in engagement with the body 11. The body 11 is clamped to a clamp body 35 and is held in a clearly defined position with respect to the welding robot 15. Through the displacement of the welding robot it is possible to approach virtually any random welding point on the surface of the body 11. It is also possible to orient the welding head 20 in virtually random manner with respect to the body 11.

The welding head 20 is preferably oriented towards the body 11 in such a way that the final infeed movement, which can be performed in force-regulated manner, takes place along a prescribed, preferably linear movement path perpendicular to the surface of the body 11 in the welding point 13. The precise knowledge of the position of the body 11 with respect to the industrial robot 15 is necessary for calculating the coordinates where there is a passage from position control and orientation of the welding head 20 to force regulation. In certain circumstances it can also be determined by suitable sensors, e.g. optical determination means. It is also possible to determine and correspondingly take account of the precise position of the body by means of corresponding sensors.

To permit a simple and rapid replacement of the welding head 20, either the base plate 28 or a part connected to the base plate 28 as the coupling 31 is constructed as the counterpart to the robot arm coupling 30. By means of the two couplings not only is a positionally defined connection between robot arm 17 and final effector 16 with welding head 20 formed, but preferably simultaneously all electrical and fluidic connections are coupled or contacted with one another.

FIG. 5 shows the end of the robot arm 17 facing the final effector 16. At the end of the robot arm 17 is located the force sensor 18, which is able to determine forces, preferably forces and moments in all directions. Following the force sensor 18 the robot arm 17 carries the coupling 30 for coupling the final effector. In this application the final effector 16 comprises the corresponding coupling 31 for coupling said effector to the robot arm and the welding head 20 with its base plate 28, which is angled in accordance with FIG. 5, so as to permit a coaxial orientation of the welding head 20 to the longitudinal axis of the robot arm 17. In the construction according to FIGS. 1 and 3, the longitudinal axis of the welding head 20 is defined by the connecting line between the gripper 24 and the first welding mirror 21.

FIG. 6 shows the flow chart of a method for welding a welding part to a body, as is possible with a welding head according to FIGS. 1 to 3 and an industrial robot with fitted welding head according to FIGS. 4, 4a and 5.

In step 601 the imminent welding task is read in, this being understood to mean that initially reading in e.g. takes place from a memory of which welding part is to be fixed at which welding point 13 on the body 11. The welding task can be polled within a cyclically polled sequence of individual welding tasks or in manually preset manner. The data of a welding task can preferably be determined in a so-called teach-in procedure. If corresponding information is mechanically determinable, it is also possible to perform a sequence to be carried out or also individual welding tasks as a function of the body made available. The information can e.g. be obtained by the optical detection of the body and optionally also its equipping with welding or mounting parts. Through the information concerning the welding task not only is the changeover position for transfer from position control to force control of the final effector of the industrial robot determined, but determination also takes place of the design of the welding head and whether on said welding head the fitted gripper is to be changed.

According to step 602, on the basis of the welding task read in, it is established whether the welding task can be performed with the welding head 20 already fitted as the final effector and in particular with the presently fitted welding mirrors 21, 22. If a welding head change is unnecessary, there is a jump to step 606. Otherwise, in accordance with step 603, the presently fitted welding head is moved to a welding head changer and is there preferably automatically uncoupled from the robot arm 17. This preferably takes place by releasing the working connection between the two couplings 30, 31 according to step 604. According to step 605 the robot arm, without the final effector, is moved to the point where the other welding head can be coupled. According to step 605 said coupling preferably takes place automatically between a coupling 30 on the robot arm and the coupling 31 on the welding head. There is then a passage to step 606.

A check is made in step 606 as to whether the presently fitted welding head has the correct gripper. If an appropriate gripper is located on the welding head, there is a jump to step 610. Otherwise, in accordance with step 607, the final effector is moved to the gripper changer. During this process it is also necessary to ensure that the gripper is accessibly oriented, i.e. that the supporting member 25 is pivoted in such a way that the gripper is oriented towards a body and not towards the second welding mirror 22.

According to step 608, by the automatic opening of the holder 34 for the gripper, the gripper to be replaced is deposited. Then, according to step 609, the welding head is moved towards the gripper to be received and the gripper is once again automatically coupled to the holder 34 for the gripper 24. A passage to step 610 then takes place.

When performing steps 602 to 609 it is also possible to record which welding head or gripper is located at which particular location. However, it is simpler if the grippers and welding heads have corresponding, mechanically processable identification features.

According to step 610, provided that this has not yet taken place, the gripper is moved into the working position, i.e. the supporting member 25 is pivoted in such a way that the gripper, as shown at the bottom in FIG. 3, is oriented towards a possible body 11 and not towards the welding mirror 22.

Then, the welding head as the final effector of the industrial robot, is moved to the acceptance point of the welding part. According to step 612 the welding part is gripped by the gripper in the acceptance point. Following the gripping of the welding part, the supporting plate is pivoted according to step 613. As a result of this pivoting action the welding part is now oriented towards the second welding mirror, whereas the first welding mirror now arrives in the position where it can engage with the body.

Now, in accordance with step 614, the final effector of the industrial robot, i.e. the welding head, is moved in coordinate-controlled manner to the changeover position. The changeover position is not only a point in space approached by the industrial robot, but instead also includes the orientation of the welding head with respect to the welding point on the body. Coordinate control takes place in such a way that the welding head is displaced and oriented to a specific point in space, which is preset or determined together with the welding task. The position-controlled displacement takes place in the conventional manner for industrial robots.

After reaching the changeover position and in accordance with step 615, the force sensor measures between the final effector (welding head) and robot arm which forces act on said arm. They are chosen as a reference point, i.e. all the force components are now set to zero. According to step 616 the force-regulated infeed movement now commences. For this either the necessary infeed path is determined by calculation or the infeed path, which was predetermined together with the welding function is activated. Preferably the changeover position is chosen in such a way that the infeed path is a linear movement to the normal to the welding point on the body. The infeed movement along the preset path is commenced according to step 617. In step 618 a check is made as to whether the actual force between the welding head and robot arm determined in the force sensor corresponds to the desired force preset e.g. together with the welding task. The desired force is fixed together with the welding task. It is a presettable quantity differing for each welding process and the force direction is preferably in each case determined in such a way that it is in the surface normal to the welding point on the body. Preferably the infeed movement also takes place precisely in this direction. If it was not determined in step 618 that the desired force has been reached, there is a jump back to step 617 and the infeed movement is continued.

If it has been detected in step 618 that the desired force has been reached, then according to step 619 the premelting and melting on process of the body takes place in the welding point. This takes place in that the first welding mirror 21 is in engagement with the welding point 13 of the body. It can be appropriate during premelting to maintain a greater force between the body 11 and welding mirror 21 than during melting on. This is achieved by a corresponding continuation of force regulation. If suitable force components and force moments are possible between the body and welding head by means of the force sensor 18, it is possible to compensate shear and tilting moments between the welding head 20 and the body by a corresponding continuation of the force regulation.

Now, according to step 620, the linear controlling element is also moved in. This is understood to mean that the second welding mirror is engaged with the welding point of the welding part. The time of the approach of the linear controlling element is preferably determined in such a way that the premelting and melting on of the welding part is ended at the same time as the premelting and melting on of the body at the particular welding point. The flow chart takes account of the case where the premelting and melting on of the welding part lasts longer than the premelting and melting on of the body. If the reverse situation arises, it is also possible to move in the linear controlling element before the first welding mirror is in engagement with the body. This can in particular take place during the infeed movement. It must also be borne in mind that the premelting and melting on process of the welding part may also only be ended when the first welding mirror has been removed from the welding point on the body.

According to step 621 a check is now made to establish whether the welding part has been premelted and melted on in the necessary way. This e.g. takes place by means of a time control. If it is established in step 621 that the corresponding time interval has not yet elapsed, the end thereof is awaited.

As soon as the corresponding time interval has elapsed, according to step 622 the linear controlling element is again moved up, i.e. the second welding mirror is moved from its setting back into the non-engagement position.

In step 623 it is now awaited until the time interval for premelting and melting on of the body has ended. If this has not taken place, there is a wait until this time interval has elapsed. In place of the time criterion it is also possible to use a different criterion for ending the premelting and melting on process on the body.

Then, according to step 624, the welding head is again moved into its changeover position. According to the preferred embodiment shown here, the welding head is moved back into the changeover position. It would also be sufficient to move the welding head into another intermediate position ensuring that the movement of the welding head between the preheating position and the pressing position of the welding part can take place without there being any collision with the body. To achieve a better movement control, it is advantageous to approach the changeover position as the intermediate position.

According to step 625 the gripper is moved now into its working position, i.e. the supporting member 25 is pivoted in such a way that the welding part held in the gripper is oriented towards the welding point on the body. In accordance with steps 617 and 618, now according to steps 626 and 627 there is a force-regulated infeeding of the welding head. The welding point of the welding part engages on the welding point of the body. The pressing force is regulated, preferably in such a way that there is a surface-normal force to the body. A check is now made according to step 628 to establish whether the necessary pressing time has elapsed for the welding part on the body. If this is not the case, whilst maintaining the correspondingly set pressing force, there is a wait until the time interval has elapsed. Only when the necessary pressing time has elapsed, is the gripper opened in accordance with step 629, so that the pressing part is now solely held on the body and then the welding head is moved back into the changeover position. To perform the next welding process there is now a jump to step 601.

What is claimed is:

1. A device for heated tool welding, comprising:
    a welding head and an infeed drive for displacement of the welding head;
    wherein the infeed drive is an industrial robot; and
    wherein the positioning of the welding head being coordinate-controlled into a clearly defined changeover position with respect to the welding point and the positioning of the welding head in the vicinity of the welding point is force-controlled.

2. The device according to claim 1, wherein the industrial robot is a 6-axis industrial robot.

3. The device according to claim 1, wherein a force sensor is positioned between the welding head and a robot arm.

4. The device according to claim 3, wherein a force sensor is positioned between the robot arm and the welding head and determines the forces acting in all directions.

5. The device according to claim 3, wherein as the returned quantity during force regulation use is made of the difference between the actually occurring force and the force at a time of the change from coordinate control to force regulation.

6. The device according to claim 1, wherein the welding head can be automatically coupled and uncoupled with respect to a robot arm.

7. A method for heated tool welding, comprising the steps of:
   providing a welding part which is accepted by a gripper of a welding head held on a robot arm at a transfer point;
   moving and orienting the welding head in a coordinate-controlled manner into a preset changeover position, preset relative to a welding point of the welding part on a body;
   in the changeover position, changing coordinate control to force regulation; and
   displacing the welding head on a preset displacement path in a force-regulated manner to the welding point.

8. The method according to claim 7, wherein the forces acting between the welding heed and robot arm are used for force regulation purposes.

9. The method according to claim 8, wherein the forces measured between the robot arm and the welding head in the changeover position are used as a reference quantity for force regulation.

10. The method according to claim 8, wherein the forces are preset as a function of the welding process.

11. The method according to claim 10, wherein the force components of the desired force are preset in such way that the desired force is oriented perpendicular to a surface of the body at the welding point.

12. The method according to claim 7, wherein initially with a preset pressing force a welding mirror is engaged with the welding point of the body, then the welding head is moved into an intermediate position where the welding head is no longer in contact with the body, then the welding part is oriented towards the welding point and in a force-controlled manner engaged with the body.

13. The method according to claim 12, wherein the intermediate position corresponds to the changeover position.

14. The method according to claim 11, wherein the orientation of the welding part to the welding point takes place without any displacement of the industrial robot in the welding head.

* * * * *